UNITED STATES PATENT OFFICE.

NATHAN SULZBERGER, OF NEW YORK, N. Y.

FLAVORING OILS.

1,127,545. Specification of Letters Patent. Patented Feb. 9, 1915.

No Drawing. Application filed August 31, 1911. Serial No. 647,012.

*To all whom it may concern:*

Be it known that I, NATHAN SULZBERGER, a citizen of the United States of America, residing at Hotel Netherland, Fifty-ninth street and Fifth avenue, New York city, county of New York, State of New York, have invented new and useful Improvements in Flavoring Oils, of which the following is a specification.

I have found that the flavor and taste of a great many oils, which are used for edible purposes in making products like compound lard, butterin, etc., can be improved upon by mixing with the same small quantities of some other oil, which itself might not even be tasteless or odorless. As an example I cite for instance the following: Cotton seed oil used very extensively in the manufacturing of products like compound lard or butterin is carefully treated and bleached (deodorized) before such use but even after such careful deodorizing treatment many times this cotton seed oil will still possess an odor or flavor and taste which is undesirable for many edible uses. I have found that when for instance about 3% of peanut oil is added to this deodorized cotton seed oil that the objectionable odor and taste is in most cases absolutely removed so that this product is put in a condition where it can be used without any criticism for edible purposes, as for instance, making compound, cooking oil, etc.

It is a novel discovery of the applicant that certain oils, as for instance the above mentioned peanut oil, while, in itself, on account of its strong characteristic odor and taste may be even more objectionable than the deodorized cotton seed oil for above uses, will, when blended with the cotton seed oil "neutralize" the objectionable odor and taste of the (unmixed) cotton seed oil, as it seems just by virtue of the characteristic odor and taste, which this oil possesses.

The above is an example just to show a specific instance of the use of applicant's novel method of improving the flavor of oils. Applicant wishes to state particularly that he does in no wise want to be limited to above described quantities or to the use of peanut oil only for the above purposes but wishes it to be understood that the scope of this invention also covers other added vegetable, edible oils outside of the above referred to oils and above referred to quantities of the same.

I claim:

1. A combination of cotton seed oil with peanut oil representing a practically tasteless and odorless mixture.

2. Process for improving the flavor of cotton seed oil, consisting in mixing with the same small amounts of peanut oil.

3. Process for improving the flavor and taste of cotton seed oil consisting in mixing with the same about 3% peanut oil.

4. Process for improving the flavor of edible fats and oils consisting in mixing with the same such quantities of edible products of an oily and fatty nature and of vegetable origin which by themselves have a characteristic odor and taste as will improve and neutralize the flavor of the original fat and oil.

5. Process for improving the odor and taste of edible fats and oils consisting in adding to an edible fat or oil such quantities of an edible vegetable fat or oil possessing a characteristic odor and taste, as will render the original fat or oil more neutral in odor and taste, not imparting to the same the characteristic odor and taste of the added vegetable fat or oil.

6. Process for improving the odor and taste of edible fats and oils consisting in adding to an edible fat or oil an amount not over 10% of an edible vegetable fat or oil possessing by itself a characteristic odor and taste, thereby rendering the original fat or oil more neutral in odor and taste.

NATHAN SULZBERGER.

Witnesses:
WILLIAM C. BUETHE,
WILLIAM ROBINSON.